US012561141B2

(12) United States Patent
Nye

(10) Patent No.: US 12,561,141 B2
(45) Date of Patent: Feb. 24, 2026

(54) APPARATUS AND METHOD FOR IMPROVING INSTRUCTION FUSION, FRACTURE, AND BINARY TRANSLATION

(71) Applicant: Condor Computing Corporation, San Jose, CA (US)

(72) Inventor: Jeffrey L Nye, Austin, TX (US)

(73) Assignee: Condor Computing Corporation, San Jose, CA (US)

( * ) Notice: Subject to any disclaimer, the term of this patent is extended or adjusted under 35 U.S.C. 154(b) by 0 days.

(21) Appl. No.: 18/635,212

(22) Filed: Apr. 15, 2024

(65) Prior Publication Data

US 2025/0321743 A1 Oct. 16, 2025

(51) Int. Cl.
*G06F 9/30* (2018.01)
*G06F 9/38* (2018.01)

(52) U.S. Cl.
CPC ...... *G06F 9/30181* (2013.01); *G06F 9/30145* (2013.01); *G06F 9/3017* (2013.01); *G06F 9/3853* (2013.01)

(58) Field of Classification Search
CPC ............. G06F 9/30181; G06F 9/30145; G06F 9/3017; G06F 9/3853
See application file for complete search history.

(56) References Cited

U.S. PATENT DOCUMENTS

| | | | | |
|---|---|---|---|---|
| 7,051,190 B2 * | 5/2006 | Samra | .................. | G06F 9/3017 712/210 |
| 7,493,474 B1 * | 2/2009 | Pechanek | ............ | G06F 9/30149 712/209 |
| 2014/0281389 A1 * | 9/2014 | Loktyukhin | .......... | G06F 9/3017 712/206 |
| 2017/0177343 A1 * | 6/2017 | Lai | ........................ | G06F 9/3016 |
| 2019/0196832 A1 * | 6/2019 | Vasekin | .............. | G06F 9/30181 |
| 2023/0418612 A1 * | 12/2023 | Du Bois | ............. | G06F 9/30181 |

* cited by examiner

*Primary Examiner* — Corey S Faherty
(74) *Attorney, Agent, or Firm* — Artie Pennington Law Offices, PLLC; Artie Pennington; Hannah Ward

(57) ABSTRACT

An electronic, digital data processor is adapted dynamically to develop for selected instructions received for execution in a pipelined execution unit a predetermined transform of the selected instructions. Depending on predetermined static or dynamic conditions that may exist in the pipelined execution unit, execution of the transform may be allowed or suppressed. The transform may be a fusion, a fracture or a binary transformation. A method is also disclosed for implementing this selective suppression of developed transforms.

4 Claims, 4 Drawing Sheets

| page[31:28] | ... | 2 | 1 | 0 |
|---|---|---|---|---|

Youngest                                                                  Oldest

| Decoded Instruction | Decoded Instruction | Decoded Instruction | Decoded Instruction | Decoded Instruction | Decoded Instruction | Decoded Instruction | Decoded Instruction |
|---|---|---|---|---|---|---|---|

Moving scan window

Maximum scan size

Max number of decoded instruction

APPARATUS AND METHOD FOR IMPROVING INSTRUCTION FUSION, FRACTURE, AND BINARY TRANSLATION

FIELD OF THE INVENTION

The present invention relates to the field of computer processors. More particularly, it relates to improved fusion, fracture, and binary translation methods and apparatus in an electronic, digital data processor, where the processor consists of a general-purpose data processor, a digital-signal processor, a single instruction multiple data processor, a vector processor, a graphics processor, a VLIW processor, or other type of microprocessor which executes instructions.

BACKGROUND

In general, in the descriptions that follow, the first occurrence of each special term of art that should be familiar to those skilled in the art of integrated circuits ("ICs") and systems will be italicized. In addition, when a term that may be new or that may be used in a context that may be new, that term will be set forth in bold and at least one appropriate definition for that term will be provided. In addition, throughout this description, the terms assert and negate may be used when referring to the rendering of a signal, signal flag, status bit, or similar apparatus into its logically true or logically false state, respectively, and the term toggle to indicate the logical inversion of a signal from one logical state to the other. Alternatively, the mutually exclusive boolean states may be referred to as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

Hereinafter, reference to a facility shall mean a circuit or an associated set of circuits adapted to perform a particular function regardless of the physical layout of an embodiment thereof. Thus, the electronic elements comprising a given facility may be instantiated in the form of a hard macro adapted to be placed as a physically contiguous module, or in the form of a soft macro the elements of which may be distributed in any appropriate way that meets speed path requirements. In general, electronic systems comprise many different types of facilities, each adapted to perform specific functions in accordance with the intended capabilities of each system. Depending on the intended system application, the several facilities comprising the hardware platform may be integrated onto a single IC, or distributed across multiple ICs. Depending on cost and other known considerations, the electronic components, including the facility-instantiating IC(s), may be embodied in one or more single- or multi-chip packages. However, unless expressly stated to the contrary, the form of instantiation of any facility shall be considered as being purely a matter of design choice.

Instruction fusion, instruction fracture, and binary translation are known to be potentially useful techniques for enhancing the performance and power efficiency of modern processors:

1. Instruction fusion comprises a process adapted to transform a set of instructions into another, typically smaller or simpler form, that has the same logical result, but improved properties, over the input, e.g., reduced cycle count for execution, etc. In fusion, multiple simple instructions are combined into a more complex instruction with the goal of reducing the execution bandwidth required by simple instruction primitives, and potentially making execution resources, execution units and computation sites, available for other instructions.

2. Instruction fracture is the opposite of fusion, in that complex instructions are broken into smaller operations with the expectation that more fine-grain hardware scheduling will improve overall performance.

3. Binary translation is a general category that is sometimes considered to encompass fusion, fracture, and other dynamic modifications between instruction representations.

In all of the above cases, the effectiveness of these transforms tends to be contextual and transitory, e.g., a static implementation of a fusion-capable instruction decoder sometimes experiences lower performance as a result of unpredictable dynamic conditions in the execution pipeline, which, of course, tends to reduce the overall benefit. For example, performance analysis of SpecCPU 2006 has shown a theoretical benefit for fusion, while in reported implementations the net effect is much lower than the theoretical.

After careful study, I have concluded that failing to take into account dynamic pipeline events when effecting transforms often negatively impacts the potential effectiveness of those transforms. My analysis has convinced me that facilitating visibility of a transform-capable decoder of at least some of the more important dynamic pipeline events will allow the decoder to make better cycle-by-cycle decisions with respect to effecting, or not, possible transformations, thereby potentially improving the performance and power benefits of transforms. What is needed, I submit, is a transform-capable decoder having visibility of important dynamic pipeline events such that all instruction transforms can be applied more effectively.

BRIEF SUMMARY OF THE INVENTION

In one embodiment, an electronic, digital data processor comprises: a pipelined central processing unit comprising: an instruction fetch facility adapted to: fetch a stream of instructions; and output said fetched instructions in a predetermined order; an instruction decode facility, coupled to the instruction fetch facility, and adapted to: receive the fetched instructions output from the instruction fetch facility; decode simultaneously M of said received fetched instructions; receive dynamically an instruction transform comprising at least one decoded transform instruction; receive dynamically an instruction transform select signal having a selected one of first and second states; and either: output said decoded instructions in response to receiving said instruction transform select signal in said first state; or: output said instruction transform in response to receiving said instruction transform select signal in said second state; and an instruction execution facility comprising an instruction execution pipeline, coupled to the instruction decode facility, and adapted to: receive the decoded instructions output from the instruction decode facility; execute said decoded instructions in the instruction execution pipeline; detect a predetermined pipeline event in the instruction execution pipeline; and either: output a pipeline event signal in a third state if said predetermined dynamic condition in the instruction execution pipeline is not detected; or: output the pipeline event signal in a fourth state if said predetermined dynamic condition in the instruction execution pipeline is detected; and an instruction transform facility, coupled to the instruction decode facility and to the instruction execution facility, and adapted to: receive the decoded instructions output from the instruction decode facility; detect in the received decoded instructions a first predetermined sequence of N of said received decoded instructions, where N is greater than 1 and no greater than M; develop said instruction transform of said first predetermined sequence of N of said received decoded instructions; receive the pipeline event signal output from the instruction execution facility; and either: output said instruction transform signal in said first state in response to receiving said pipeline event signal in said third state; or: output said instruction transform signal in said second state in response to receiving said pipeline event signal in said fourth state.

In one other embodiment, an electronic, digital data processor comprises an pipeline execution unit and is adapted to: decode an instruction; develop a predetermined instruction transform of said instruction; and perform a selected one of: executing said instruction transform in response a predetermined event in said pipeline execution unit; and executing said instruction otherwise.

In yet another embodiment, a method for use in an electronic, digital data processor comprising a pipelined execution unit, the method comprising the steps of: fetching a stream of instructions; decoding at least one of the instructions; developing dynamically an instruction transform of at least one of the decoded instructions; and performing a selected one of: executing said instruction transform in response a predetermined event in said pipeline execution unit; and executing said instruction otherwise.

In still another embodiment, a method for use in an electronic, digital data processor comprising a pipelined execution unit, the method comprising the steps of: fetching a stream of instructions; decoding at least one of the instructions; developing dynamically an instruction transform of at least one of the decoded instructions; and depending on a predetermined condition that may exist in the pipelined execution unit, selectively suppressing execution of the transform.

In all embodiments, the instruction transforms comprise at least a selected one of: fusion; fracture; and binary transformation.

BRIEF DESCRIPTION OF THE SEVERAL VIEWS OF THE DRAWINGS

Aspects of the present invention are best understood from the following description when read with the accompanying figures.

4

Figure 8:
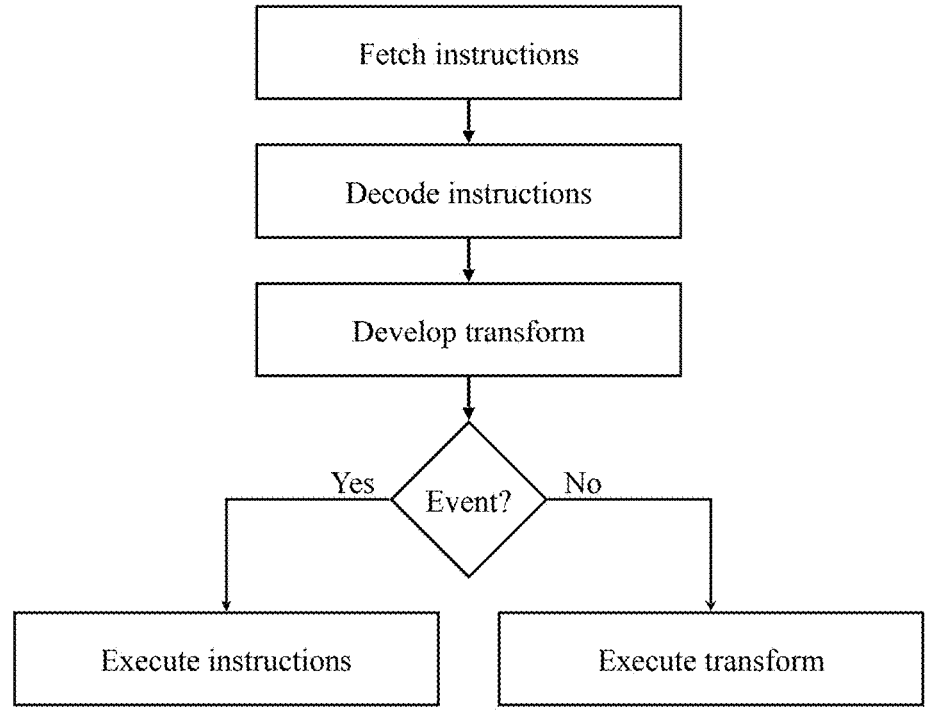

FIG. 8 illustrates, in flow diagram form, a method for selectively allowing or suppressing execution of developed transforms.

DETAILED DESCRIPTION

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

Figure 1:
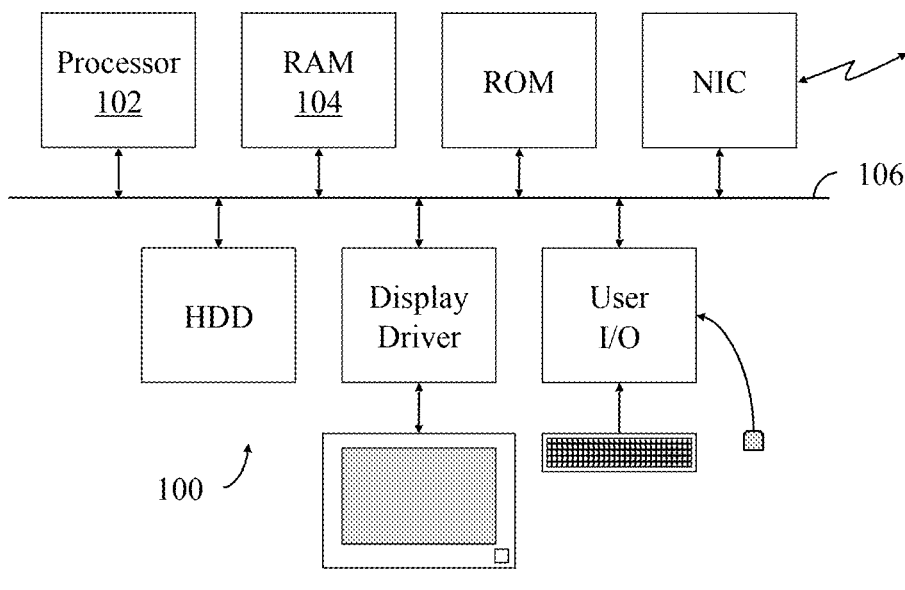
FIG. 1 illustrates, in block diagram form, a general-purpose computer system adapted to practice any of the embodiments I will disclose hereinafter.

FIG. 1 illustrates, in block diagram form, a typical general-purpose computer system 100 according to some embodiments. The general-purpose computer system 100 is adapted to utilize the apparatus and methods disclosed herein, specifically the instruction fusion, fracture, and binary translation apparatus and methods. The general-purpose computer system 100 includes at least one processor 102 as well as random access memory 104 ("RAM") and other components. The processor 102 is operable to communicate with RAM 104 via bus 106 as well as communicate with other components of the general-purpose computer system 100.

Figure 2:
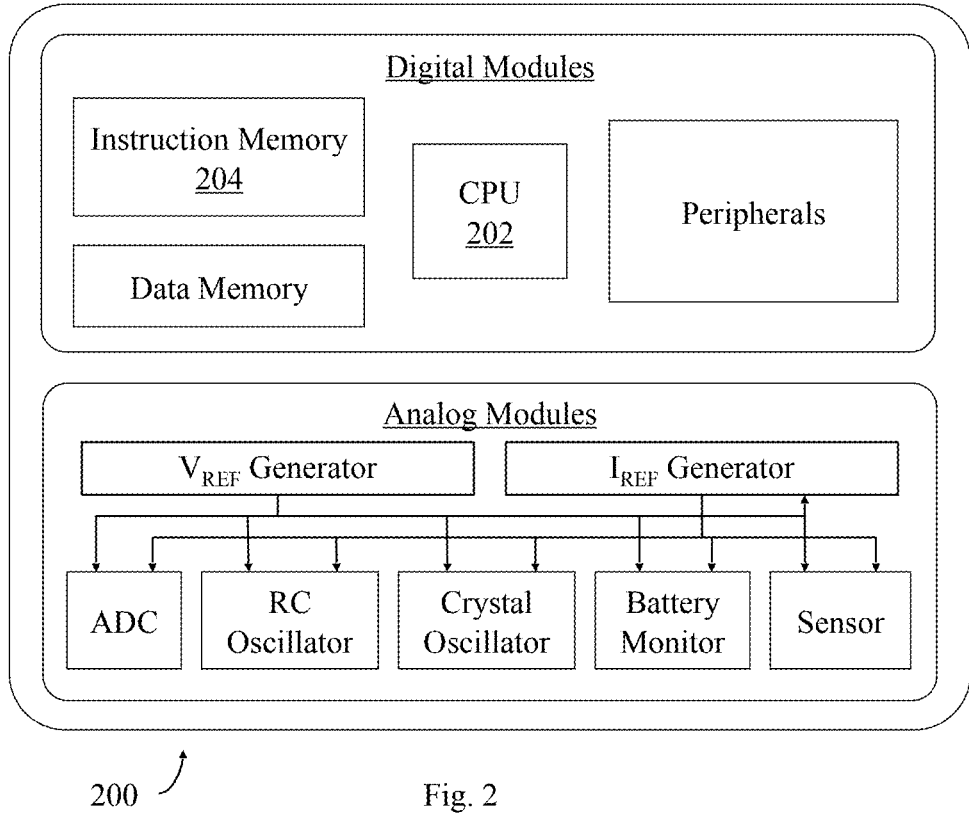
FIG. 2 illustrates, in block diagram form, a typical integrated system adapted to practice any of my embodiments.

FIG. 2 illustrates, in block diagram form, a typical integrated system 200 comprising, inter alia, at least a single central process unit 202 ("CPU") according to some embodiments. The CPU 202 is adapted to execute and utilize the fusion, fracture, and binary translation apparatus and methods described herein. The typical integrated system 200 also may include instruction memory 204, data memory 206, along with other peripheral units and various analog units.

Figure 3:
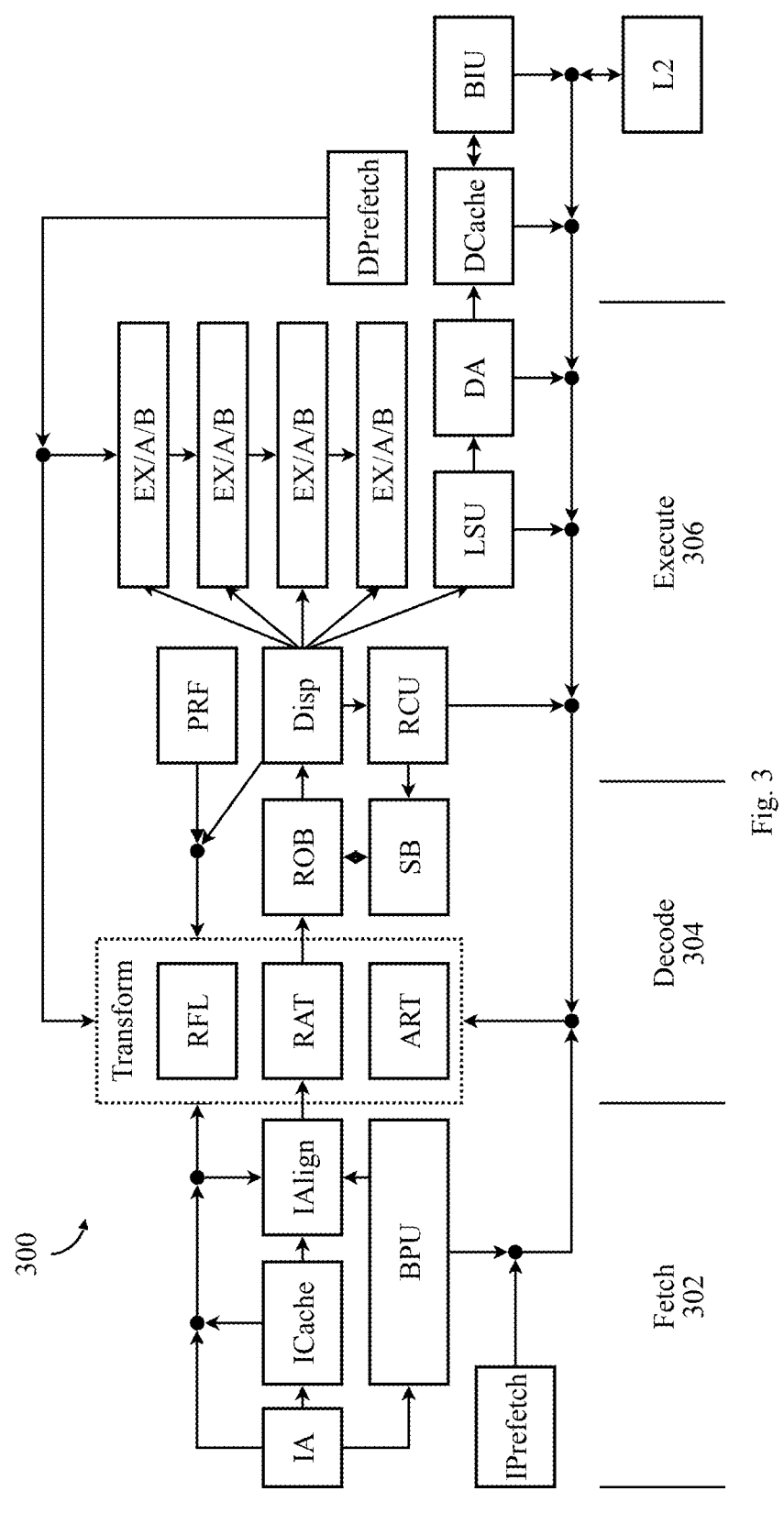
FIG. 3 illustrates, in block diagram form, portions of an execution pipeline of a central processing unit having a transform-capable decoder adapted to practice the preferred embodiment of my invention.

FIG. 3 illustrates, in block diagram form, one embodiment of an instruction processing pipeline facility 300 which is included in CPU 202 of FIG. 2. Pipeline 300 includes an instruction fetch facility 302, an instruction decode facility 304, and an instruction dispatch facility 306. In the illustrated embodiment, I have adapted the decode facility 304 to include the fusion, fracture, and binary translation apparatus and methods described herein. As one of ordinary skill in this art would understand, the illustrated instruction processing facilities may vary in size and implementation according to known factors, e.g., the processor's design instruction set architecture, the micro-architecture of the processor, etc.

For convenience of reference, I have used in FIG. 3 the following abbreviations:

| In the Fetch facility 302: | |
|---|---|
| IA | Instruction Address register |
| ICache | Instruction Cache |
| IAlign | Instruction Align |
| BPU | Branch Prediction Unit |
| IPrefetch | Instruction Prefetch |
| In the Decode facility 304: | |
| RFL | Register Free List |
| RAT | Register Alias Table |
| ART | Architectural Register Table |

5

-continued

| ROB | Reorder Buffer |
| SB | Score Board |
| | In the Execute facility 306: |
| PRF | Physical Register File |
| DISP | Dispatch |
| RCU | Read Control Unit |
| EX/A/B | Execute [instruction] A [or] B |
| LSU | Load/Store Unit |
| DA | Data Address register |
| | Downstream of the Execute facility 306: |
| DPrefetch | Data Prefetch |
| DCache | Data Cache |
| BIU | Bus Interface Unit |
| L2 | L2 cache |

Figures 4, 5, 6:
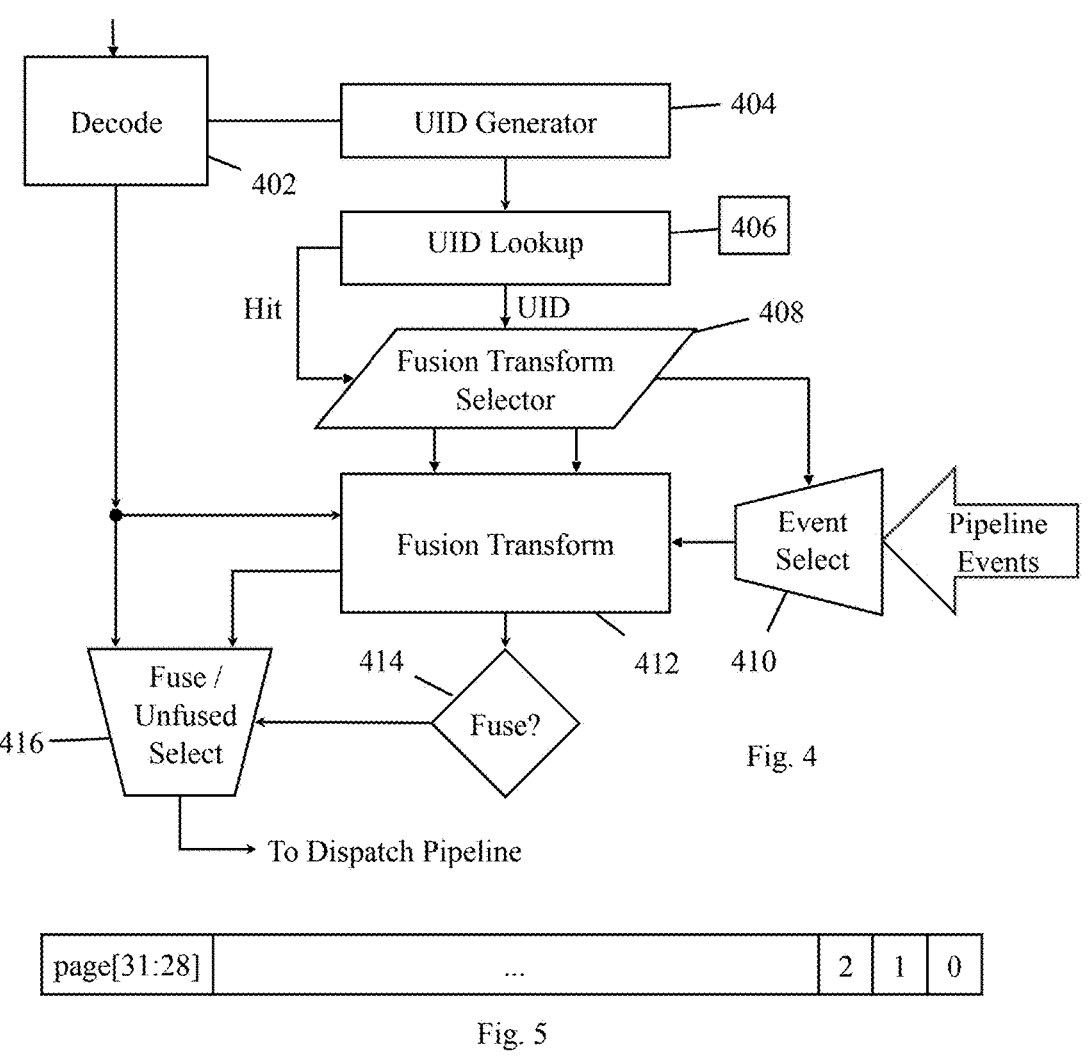
FIG. 4 illustrates, in block diagram form, one embodiment of the transform facility shown in FIG. 3.
FIG. 5 illustrates one possible embodiment of my TER.
FIG. 6 illustrates, in time-flow form, a typical instruction decode flow process, but as viewed from the perspective of my transform-capable decoder.

FIG. 4 illustrates, in a more detailed block diagram form, one possible embodiment of the transform facility of FIG. 3. In accordance with this embodiment, an N-wide instruction decoder 402 decodes the instructions, and passes an abbreviated version of the N-wide function bits to a UID hash generator 404, where N could be 64b. I recognize that the selection of the hashing function is a matter of design choice; and is generally determined, during design, by the properties of the instruction sequences originally selected as candidates for fusion. In the case of the Pearson hash, which I prefer, the contents of the randomization table are created to ensure there is no overlap or false hits for the supported fusable sequences.

In this embodiment, the output of the UID generator 404 is an 8-bit wide value used to index into a UID lookup facility 406. The UID lookup 406 determines whether the calculated hash has a known fusion transform, and, if so, the UID of that fusion transform is output, simultaneous with a hit signal, to a fusion transform selector 408. In response to receiving both the UID and the hit signal, the fusion transform selector 408 converts the received UID into: an event selector signal; a fusion transform selector signal; and a instruction selector signal. The function of the fusion transform selector 408 is to facilitate a many-to-one mapping of the UID to event and transform selector values.

In response to receiving an event selector signal, an event selector mux 410 will select for output to the fusion transform facility 412 one or more of the pipeline event signals generated by the pipeline facility 300 (see, FIG. 3). I recognize, however, that the event selector mux 410 is just one possible implementation; one possible alternative would be to route ALL important pipeline events directly to the fusion transform facility 412.

In response to receiving the instruction selector and transform selector signals, my fusion transform facility 412, performs the transformation of the input decoded instructions to the fused version. However, in accordance with my invention, in response to receiving the pipeline event signals output by the event selector mux 410, my fusion transform 412 takes the received event signals into consideration when deciding whether to fuse or not fuse the function group instructions—I have depicted this decision, conceptually, as the fusion selection decision facility 414.

Finally, a fuse/unfused select mux 416 selects either the unmodified instructions or the fused version for output to the down-stream pipeline facility 300.

Terminology

For the purposes of the present disclosure, I intend that the following terminology include all environments and alternate technologies that provide the same functionality described herein.

1. Fusion: The operation of transforming a set of incoming, instructions to another form, typically smaller or simpler, that has the same logical result but improved properties over the input, e.g., reduced cycle count for execution, etc.
2. Fusion Group: A set of instructions with a pre-defined fusion transformation. In accordance with my preferred embodiment, each Fusion Group consists of: a list of UIDs, each of which is a proxy for a respective opcode; and a definition for operand constraints.
3. Fusion Window: A sliding window across the stream of decoded instructions. In my preferred embodiment, I use the window simultaneously to compare the incoming stream of decoded instructions to all implemented Fusion Groups.
4. UID: Each instruction has a unique identifier. The UID is operand independent, and in most cases, it is the opcode field. In my preferred embodiment, each UID is <=8 binary bits, hereinafter abbreviated as "8b".
5. Hash or Fusion Group hash: To reduce the hardware required in the instruction decoder, each Fusion Group has a hash formed from the UID's of the instructions comprising the Fusion Group. I use this hash value to match pre-defined sequences of one or more consecutive instructions in the input instruction stream to a known Fusion Group, i.e., this Hash comprises a unique identifier of each Fusion Group. In my preferred embodiment, each Fusion Group hash is <=12b.
Note: This is one possible one way to handle large Fusion Groups, but it is not required. I will explain this detail hereinafter.
6. Translation: This is a process in my flow that translates, i.e., converts, a matching UID/Hash value to two to three narrow width, selector fields: the instruction selector; the transform selector; and the event selector. The event selector is an implementation choice.
The translation has two purposes: to reduce the number of bits in the selectors; and to allow a many-to-one mapping of the input to outputs, which helps with reuse; that, in turn, reduces the sizes of the fusion transform internal muxes and the size of the event mux.
7. Fusion transform: This is the process of translating the incoming stream of decoded instructions.
In my preferred embodiment, conversion is conditional on a set of static constraints on the instruction operand field values of incoming instructions, as well as a set of dynamic constraints on the pipeline events.
The outputs of the Fusion Transform block comprise: a flag indicating that it is possible to replace incoming instructions with fused versions, \; and control signals to remove the incoming instructions targeted to be fused from the input. Thus, enable/disable of a specific transform is controlled by corresponding bits in the TER.
8. Transform Enable Register(s) (TERs): The TER(s) are memory mapped registers which contains an enable bit for each Fusion Group. If there are more than 32 Fusion Groups supported there are more than one TER, and, hereinafter, I will propose a facility to support a multi-word, i.e., more than one 32-bit word, TER.
9. Pipeline events or dynamic events: Pipeline events comprise a set of dynamic status flags, each of which corresponds to a particular, temporary state of the pipeline facility. In my preferred embodiment, I capture these events and forward them to the Fusion Decoder, where they are then filtered on a per-fusion-group basis using the selectors developed by my Translation facility.

In general, pipeline events are selected for each of the Fusion Groups depending on the instruction types which make up that Group. In my preferred embodiment, I have used conventional performance analysis tools to identify in selected benchmark programs the sensitivity of each possible Fusion Transform to particular pipeline events, and then I built those I deemed to be most effective into the RTL implementation of the Transform facility. I will discuss hereinafter some of the factors I deem indicative of transform efficacy, but recognize that others exist and, in other embodiments, the selection will be a matter of design choice.

10. Static constraints: Static constraints on a transform are commonly caused by structural limits in the microarchitecture. A common example is the number of read and write ports in the Physical Register File (PRF) facility. Depending on the operand encodings in a Fusion Group a specific instance of that group may or may not exceed the number of RD/WR port limits. Typically, these can be detected without knowledge of other execution state.

11. Mixed constraints: There are cases where the constraints could be a mix of dynamic and static state. For example, a processor with heterogeneous slices may implement more RD/WR ports for one slice vs. others. Which means the constraints on a transform are based on the availability of a slice which meets the structural requirements of the Fusion Group.

12. Computation site: A term adapted from VLIW processors that represents a location in a functional unit where the operations contained in the fused operation can be performed, either a single location or a set of locations within the slice.

13. USE/DEF operands: A term I borrowed from compilers. A DEF operand is defined/written by an instruction execution, typically a destination register, but could also be a register which is modified as a side effect. A USE operand is read by an instruction. If reading a register automatically modifies it, the register is both USE and DEF. Immediate operands are neither USE nor DEF.

Fusion Group

Below is an example of a pre-defined 2-instruction Fusion Group.

> Note: I assert no claim that this is a practical example, but I believe that it will be helpful for my explanation. In all of my assembly source code examples, I will use the syntax and semantics defined in the RISC-V Instruction Set Architecture (ISA).

Consider first this assembly source code sequence:

| ASM | Source: | |
| --- | --- | --- |
| xor | x13, x15, x10 | |
| c.andi | x13, 1 | # unsigned immediate |

In accordance with my invention, I develop for this particular code sequence a corresponding Fusion Group having a pre-calculated Fusion Group hash equal to 0x6941—I shall refer to this number below.

| FUSION GROUP 1 – Hash = 0x6941 | | |
| --- | --- | --- |
| UID | Mnemonic | Operands |
| 0x1c | xor | XAA, XBB, XCC |
| 0x16 | c.andi | XDD, UIA |

As I have already noted, the Fusion Groups are predefined and implemented directly into the RTL and so are a static representation. I expect the exact format of this representation to be adapted to the needs of the RTL.

Transform Enable Register

In my preferred embodiment, illustrated in FIG. 5, I define the bits comprising the TER as follows:

TER[31:28]==page select bits

TER[31:28]==4'hF is the global enable, i.e., all transforms are enabled with this setting and the individual enable bits are ignored. 4'hF is the reset value for this register.

TER[31:28]==4'h0 is the global disable, i.e., all transforms are disabled with this setting and the individual enable bits are ignored.

TER[27:0]==group enable bits

In the process of selecting Fusion Groups for implementation in the RTL, I assign each Fusion Group a corresponding page assignment and enable bit in the TER. In the event that I decide to implement more than 28 Fusion Groups, I must implement additional TERs, each implementing an additional 28 group enable bits but having a unique combination of page select bits.

Fusion Window

Conceptually, my Fusion Window facility comprises a sliding window that I use to match incoming instructions against the predefined Fusion Groups. In FIG. 6, I have illustrated my invented terminology.

The instruction decoder design sets the maximum number of simultaneously available decoded instructions. The maximum scan size and moving scan window are design choices based on the lengths of the predefined Fusion Groups. In the simplest implementation, the two scan window sizes can be the same length, thereby eliminating the need for a moving window.

Figure 7:
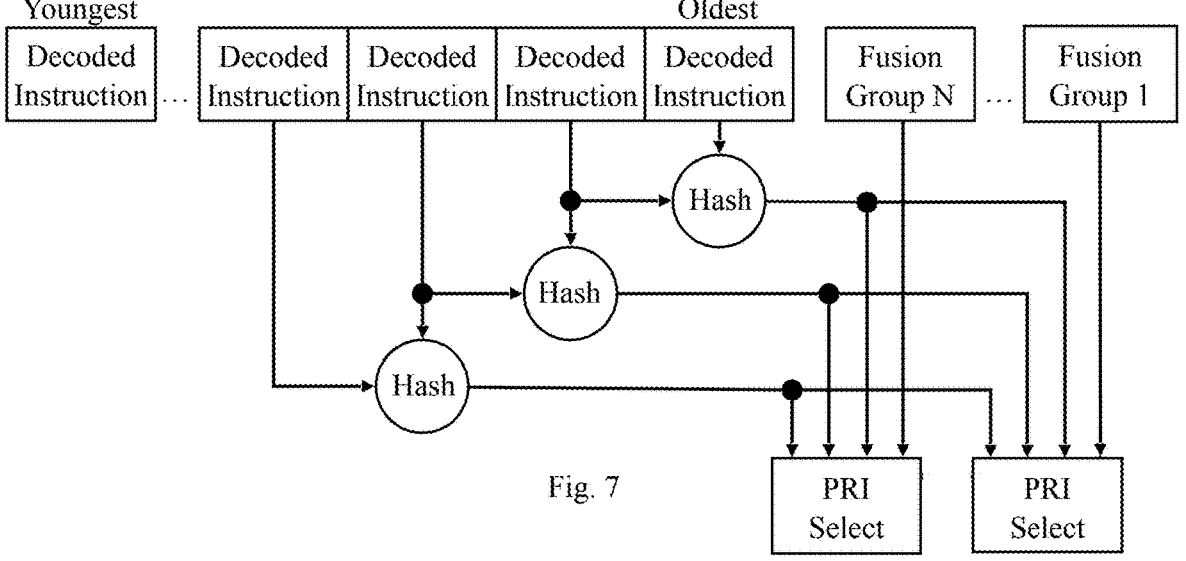
FIG. 7 illustrates how my transform-capable decoder can be adapted to detect, substantially simultaneous with the normal instruction fetch and decode process, those instruction sequences comprising transform candidates.

Using an assumption of a maximum scan size of 4 and a maximum Fusion Group length of 2, a high-level view of one implementation using Fusion Group hashes is illustrated in FIG. 7. During normal operation, the hash of each of the decoded instruction opcodes (or a hash of some conveniently defined extra field in the decoded instruction) is dynamically generated, then matched in the PRI Select facilities against the precalculated hashes of the predefined Fusion Groups. Hit signals from the PRI Selects are gated by the corresponding bits in the TER.

> Note: Shown by way of example in Appendix 1, attached hereto and hereby expressly incorporated herein, is one possible embodiment of a PRI Select facility.

Selecting when there are multiple hits is straight forward. If the Fusion Groups are organized with the longest group on the right and PRI Select inputs put the oldest instructions on the right. Selecting the right most PRI and right most of A/B/C will automatically select the longest match of the oldest instructions.

Translation

The Fusion Transform Selector facility 408 (see, FIG. 4) converts the incoming hash to a set of narrow width fields. These fields are the Event Selector, the Transform Selector and the Instruction Selector. This translation enables many to one mappings of incoming hash to selector values. which enables reuse of transforms and event mux outputs. I believe it to be possible, using Fusion Group #1, without loss of generality, to choose 0x1 for all three selector values.

Fusion Transform

The fusion transform function is performed in two steps. There is a constraints satisfaction step followed by the actual transform.

Fusion Transform Constraints

A fusion transform is performed on the input instructions if the constraints are met. If the constraints are not met the target instructions are not unmodified. Roughly two classes of constraints are identified, static and dynamic.

Note: There is also a selection criterion that is not visible to hardware. These are criteria which affect the Fusion Group's selection in the first place. Analysis for these criteria is done automatically in the tools. I mention this here because the criteria can change during performance analysis. Examples are:

a) is a Fusion Group viable if it crosses a basic block (partially yes);

b) how many branches can be contained in the Fusion Group (max 1 predicted taken branch and N predicted not-taken branches, where N is greater than 1);

c) what are the maximum number of loads/stores in a Fusion Group (depends on the availability of space in the respective load or store buffers); etc.

Note: This list tends to grow over time.

Static Constraints

A common static constraint is defined by the number of register file ports available in the target slice. A minimum viable read/write port limit for fusion is 1 write and 2 reads. Fusion effectiveness is improved by increasing the number of register files ports with 2wr/4rd a sweet spot between effectiveness and complexity in the PRF design.

There are more constraints depending on the micro-architecture of the processor and relate to the combinations of instructions and operands within the Fusion Group.

A walk-through of static constraints checking for register file ports:

This is the example input assembly source text, repeated from a previous section. The example continues assuming 1wr/2rd on the target register file.

| INPUT | ASM SOURCE: |
| --- | --- |
| xor | x13, x15, x10 |
| c.andi | x13, 1 |

By inspection we can see the live range of x13 is one instruction; it is set by the XOR; then used and immediately overwritten by the ANDI.

So, the two RD values only consume 1 write port. Similarly for the ANDI, even though X13 is both a use and def, the XOR output value is an intermediate value, directly forwarded to the ANDI. Therefore, the read port limit is also not exceeded.

Determining the number of read and write ports required by this sequence is formulaic and suitable for hardware implementation. This example uses a 32b count1s module.

1. A fusion capable decoder creates a 1-hot vector for each operand encoding.

2. The set of RD 1-hot vectors are OR'd, separately, call this result OR.RD.

3. The set of RSx 1-hot vectors are also OR'd, separately, call this result OR.RS.

4. A count1s operation on OR.RD determines the number of write ports required by the Fusion Group.

5. A count1s operation on OR.RS determines the number of read ports required by the Fusion Group.

6. If count1s(OR.RD) exceeds the number of write ports implemented the Fusion Group is not selected.

7. If count1s(OR.RS) exceeds the number of read ports implemented the Fusion Group is not selected.

Although in this example I have assumed homogeneously implemented slices, I recognize that this is not required. Also, there can be multiple tests for heterogeneous slice implementations.

The example above meets the constraints.

This example shows an operand set which causes the Fusion Group to be rejected for fusion. Given the extremely limited WR/RD ports in this contrived example, this sequence would not meet the static constraints, Alt Input ASM Source:

```
xor      x13, x15, x10
c.andi   x14, 1          <- this would not be fusable with 1WR/2RD
```

There are two write ports required and therefore this version of the operand set will not meet constraints. The process above will catch this and reject the Fusion Group due to not meeting the static constraints.

Note: I recognize that the examples I have provided are simple but, in my opinion, they do represent an important class of fusable operations. In the statistical calculations across CoreMark-Pro, this pattern of simple Boolean operation pairs with predictable operand sets appears in >10% of the executed inner loop instructions.

Dynamic Constraints

Dynamic constraints are an important part of this disclosure. By making events in the pipeline visible to the fusion logic the application of fused operations is more effective. Past implementations of fusion suffer from lack of adaptability to pipeline behavior.

Dynamic constraints are checked in parallel with the static constraints. The difference is the transient nature of the inputs for dynamic constraints.

The pipeline events mux plus selector is one possible embodiment. It is also possible to simply route all pipeline events directly to the fusion module and each individual block of logic for the fusion transforms. Regardless, the concept is the same, a limited set of events are used by the transform logic for a given Fusion Group.

In my preferred embodiment, the pipeline events that I choose to identify comprise:

slice specific stalls or bubble conditions

MSS/DLI/L2 hit/miss status

For transforms which include load/store (LD/ST) and other operations, it may be preferable to break up the Fusion Group and allow the non-LD/ST elements to proceed normally when long L1/L2 miss delays can be expected.

Replay events

Branch prediction state

Reorder buffer entry count

Load and store buffer conditions

Events reported by the instruction scheduler:

instructions with unknown/un-estimated completion times, allocated reservations for read and write ports of the PRF, etc.

Note: I recognize that this is not a complete list, but, for the purposes of this disclosure, I believe that it will be sufficient to teach the basic principles of my invention.

The pipeline events are conditioned prior to presentation to the Fusion Transform facility 412 (see, FIG. 4). This typically will require adding pipe stages to filter transient status (e.g., counting stalls rather than directly reporting the stall state so that only significant stalls impact fusion, etc). However, as will be clear to those familiar with this art, the conditioning of pipeline events is mutable. Possible variations include, among others, the implementation details of the processor, e.g., number of pipe-stages, wire length for signals transporting the events, clock rate, power savings mode, etc. Further, the conditioning of pipeline events is also dependent on the source of the event, e.g., the amount of staging required for transporting a signal from the BIU (FIG. 3) to the Fusion Transform facility 412 (FIG. 4) vs the amount of staging required from the BPU (FIG. 3). Indeed, in some processor designs there may be no conditioning required at all due to the implementation characteristics of that processor.

These events allow the fusion logic to make decisions on full fusion, partial fusion, or pass the instructions unmodified. Full fusion or pass through use similar mechanics to the static constraints process.

Partial fusion of a Fusion Group is most easily implemented by providing alternative versions of the Fusion Group rather than dynamically making this decision. I recognize that this may result in some redundancy, but it may reduce complexity.

The three Fusion Groups depicted below are related: 1.A includes a trailing branch; 1.B eliminates the trailing branch; and 1.C is defined such that it can be fused in a branch related group (italicized) and an ancillary group (underlined). These are the important optimizations that can be made when pipeline events and state are available to the fusion capable decoder.

Note: Not all these variations and options are appropriate for all designs. However, the concept is key to enabling maximum dynamic fusion options.

| Sequence 1.A | | | | |
| --- | --- | --- | --- | --- |
| 0x1c | 0xa7c6b3 | xor | x13, x15, x10 | R-type |
| 0x16 | 0x8a85 | c.andi | x13, 1 | CB-type |
| 0x13 | 0x8325 | c.srli | x14, 9 | CB-type |
| 0x13 | 0x8105 | c.srli | x10, 1 | CB-type |
| 0x03 | 0xc691 | c.beqz | x13, 12 | CB-type |

| Sequence 1.B | | | | |
| --- | --- | --- | --- | --- |
| 0x1c | 0xa7c6b3 | xor | x13, x15, x10 | R-type |
| 0x16 | 0x8a85 | c.andi | x13, 1 | CB-type |
| 0x13 | 0x8325 | c.srli | x14, 9 | CB-type |
| 0x13 | 0x8105 | c.srli | x10, 1 | CB-type |

| Sequence 1.C | | | | |
| --- | --- | --- | --- | --- |
| 0x1c | 0xa7c6b3 | xor | x13, x15, x10 | R-type |
| 0x16 | 0x8a85 | c.andi | x13, 1 | CB-type |
| 0x13 | 0x8325 | c.srli | x14, 9 | CB-type |

-continued

| Sequence 1.C | | | | |
| --- | --- | --- | --- | --- |
| 0x13 | 0x8105 | c.srli | x10, 1 | CB-type |
| 0x03 | 0xc691 | c.beqz | x13, 12 | CB-type |

Final Fusion Transform

If the constraints are satisfied, the actual transform operation is a mapping of decoded instructions from one form to the other. This mapping is guided by the implementation and the structures in the implementation for maintaining decode instructions. Also, I believe it that fusion will interact favorably with trace caches and uop caches.

In some implementations, it is likely the operand decoding would remain the same and the principal transformation would be the generation of an opcode for the fused operation. For example, I have identified a particular fusion group comprising 5 opcodes that may be translated to a single opcode, with an out-of-band flag bit and an opcode based on the UID created earlier. In this example, the flag bit serves to identify the fused opcode as the result of a fusion operation.

Fracture Operations

As will be clear to those skilled in this art, fusion often results in fewer operations submitted for dispatch. In contrast, fracture tends to perform the opposite, creating multiple micro-ops from a single complex instruction. Therefore, considerations are required to assess the pipeline's ability efficiently to absorb the additional micro-ops and resolve the new dependencies introduced by the fracture operation. Fracture also benefits from visibility of the pipeline state for similar reasons as fusion, since pipeline events allow for dynamic choices in the fracture operation.

The opportunities for fracture in the RISC-V ISA are more commonly found in the ISA extensions, rather than the main ISA instruction groups. In general, the atomic instructions are candidates for fracture analysis. For example, the compare-and-swap instruction, AMOSWAP.W/D., can be broken into a load-modify instruction and a separate store instruction. This is also true of the other AMO based instructions.

Other candidates include floating point operations, in particular those operations which are emulating the primary operation or those where emulation is used to support wider operations than the hardware has implemented.

Binary Translation

Binary translation is the term generally used when both fusion and fracture are used to restructure instruction sequences. For example, Crypto instructions in the Zkg extension would benefit from a mixture of fusion and fracture.

By way of explanation, consider the following example code, which is a typical loop using the GHASH instruction as part of Galois field calculations:

```
# - a0: Points to the input data block
# - a1: Points to the GHASH key
# - a2: Points to the accumulator (current GHASH state)
# - a3: Number of bytes in the input data block
.loop:
    # Load a 128-bit block of input data
    vsetvli x0, a3, e8, m1, ta, ma     # Set vlen bytes remaining
    vle8.v v0, (a0)                    # Load v0 w/ 128-bit block into
    # Perform GHASH multiplication can be fractured into separate operations which may
    #give opportunities in optimizing the schedule of the new micro-ops
    ghash v1, v0, v1                   # Multiply accum with input block (v0)
    # Update pointers and loop counter
    add a0, a0, x0              # Advance input data pointer   # Fusion Group element.
    sub a3, a3, x0             # Decrement remaining bytes      # Fusion Group element
    bnez a3, .loop            # Continue loop as needed        # Fusion Group element.
    # Final result is in vector register v1
```

In this example, the instructions at the bottom of the loop, add/sub/bnez are candidates for fusion, while, in some micro-architectures, the ghash instruction would benefit from fracture.

Impact of Dynamic Constraints

One key element of my invention is that with the availability of pipeline events, also described above as dynamic constraints, my Transform facility (see, FIG. 3) now has the information necessary for dynamic selection of transforms. Insofar as I am presently aware, this capability is not present in current designs. With this visibility of pipeline events/dynamic constraints, my transform process may be used with any combination of fusion, fracture, translation or pass through.

Fusion Group Examples from ARM ISA

The discussion so far has focused primarily on the RISC-V ISA. However, the concepts discussed herein are not limited to RISC-V. What follows is a summary of some fusable operations I have found in the ARM ISA. I expect equivalents exist in almost all ISAs, particularly those with roots in RISC architecture concepts.

What follows is a brief categorization of classes of fusion options in the ARM ISA. This is not exhaustive. The benefits to visibility of pipe events translates directly, independent of RISC-V vs ARM ISAs.

Load/Store and any operation (ST/LDR+OPR): Load and stores followed or preceded by Boolean operations are prevalent in the ARM traces of mainstream benchmarks, as are LD/STs bracketed by arithmetic operations, e.g.:
LDR R1, [R2]
ADD R3, R1, R4
LDR R1, [R2]
AND R3, R1, R4

Compare and Branch (CMP+B.xx): Compare and branch sequences have opportunities for fusion similar to RISC-V/MIPS/etc.:
CMP R1, R2
BEQ label Move and Arithmetic/Logical Operation (MOV+OP): In general, moves coupled with any operation, in the following case an arithmetic operation, will benefit from fusion.
MOV R1, #5
ADD R2, R1, R3

Pipeline Events

Let us now consider three examples of common pipeline events:
1. Availability of functional units;
2. Branch predictor expectations; and
3. Properties in the LSU pipeline.

Note: Example #3, below, comprises an example where a fusion vs fracture choice is made based on a selected pipeline event.

Example #1: availability of the required computation site. This is the target sequence:

| | | |
|---|---|---|
| 0xb | 0x76e9 | c.lui x13, +0xffffffffffffa000 |
| 0xd | 0x685 | c.addi x13, x13, +0x1 |
| 0x1c | 0x8d35 | c.xor x10, x10, x13 |
| 0xf | 0x1542 | c.slli x10, x10, IMM=0x30 |
| 0x13 | 0x9141 | c.srli x10, IMM=0x30 |
| ['0xb', '0xd', '0x1c', '0xf', '0x13'] 216482 | | |

Note: There is a savings of ~0.8M cycles (8%) in the benchmark (10M instructions) by fully fusing this operation, calculated as: 216482*4/10000000=8.659% reduction in cycles.

In such an embodiment, fusion choices will be made based on the availability of the computation site for each operation. For example, consider the following possible fused sequences, wherein numbers in { . . . } represent the new opcode for the fused operation.

Case A: the computation site for the fully Fused version {c.lui,c.addi . . . c.srli} is available, so everything is Fused, resulting in saving 4 cycles.

Case B: the full version is not available, but two sites are available, so fusion is done in two chunks, {0xb,0xd} and {0x1c,0xf,0x13}, saving 3 cycles.

Case C: only the zero extend site is available, so c.slli and c.srli are fused, but the rest are left unfused, saving just 1 cycle;

Results of the three cases:

| | |
|---|---|
| A: {0xb, 0xd, 0x1c, 0xf, 0x13} | 8% savings |
| B: {0xb, 0xd} {0x1c, 0xf, 0x13} | 6.5% savings |
| C: {0xf, 0x13} | 2.2% savings (typical of common fusion) |

Example #2: output of the BPU for a branch in the target sequence.
This is the target sequence:

| | | | |
|---|---|---|---|
| 0x3 | 0x16f68063 | beq | x13, x15 +0x160 |
| 0x21 | 0xfd06851b | addiw | x10, x13, +0xffffffffffffffd0 |
| 0x16 | 0xff57513 | andi | x10, x10, +0xff |
| 0xd | 0x4825 | c.li | x16, x0, +0x9 |
| ['0x3', '0x21', '0x16', '0xd']: 326400 | | | |

If the BPU indicates the BEQ will not be taken, fusion will occur, thereby saving 3*326400 cycles/ 10000000=9.79% of cycles.

Note: if the branch predictor is incorrect, un-winding the state in the ROB is a single instruction rather than 3, a further benefit.

Example #3: a combination of multiple pipeline events: LSU stalls/busy state; potential target address D-Cache hit; and potential hit in load/store pending buffers.

| | | |
|---|---|---|
| 0x17 | 0x843a | c.mv x8, x0, x14 |
| 0x2d | 0x6018 | c.ld x14, x8, +0x0 |
| 0x34 | 0xe014 | c.sd x13, x8, +0x0 |
| 0x17 | 0x86a2 | c.mv x13, x0, x8 |
| ['0x17', '0x2d', '0x34', '0x17']: 591600 | | |

Fracture choices are based on bus traffic, judgement on the effectiveness of load/store double word versus a fracture to 2 load words (LW), 2 store words (SW).

The load and store double words are operating on the same address, in x8, which is actually in x14, so, effectively, I am saving *x8 to x14, then replacing *x8 with x13 contents.

I can choose to do this transform a number of ways:

1. As a combined "replace" instruction assuming the LSU has the ability to accept the fused replace instruction or not (comp. site available)
2. I can choose to not fuse the load with the store if address in x8 is likely to miss the cache or the pending buffers. (dcache predicted hit, buffer hit, buffer full state)
3. Based on bus traffic, L2 split transaction state, etc, I can choose to split the load double (ld), store double (sd) into smaller chunks, 2× load word, (bus/NOC/L2 hit/ miss predictions)
4. Depending on the choices above I can alter the way the c.mv to x8 is used to reduce the need for write ports on the physical register file.
5. I can choose to fuse the c.mv with the c.ld/c.sd and c.mv as a single or multiple temp register.
6. I could also consider altering the way the bracketing c.mv are fused with the succeeding or preceding instructions.

Excluding load/store latency, assuming this is hitting, this saves 2 or 3 instructions, times 591K cycles out of 10M.

Additional Pipe Events

In the following, the abbreviations can be found above.

```
ROB:
    Entries remaining
    Flush pending/in flight
    Max retire rate
RAT/RFL/ART:
    Number of slots for each, RAT/RFL/ART
    Number of renames slots available
PRF:
    Total write ports available
    Total read ports available
    Write port usage scheduled/predicted
    Read port usage scheduled/predicted
DISPATCH:
    Completion estimation times for pending integer instructions
    Completion estimation times for pending floating point instructions
    Completion estimation times for pending load/store instructions
BIU/NOC:
    Number of pending transactions
    BIU transaction buffer entries remaining
PREFETCHER
    I-side prefetcher state, ACTIVE, PENDING, BLOCKED, SCATTER/GATHER,
PREDICTED
    D-side prefetcher state, ACTIVE, PENDING, BLOCKED, SCATTER/GATHER,
PREDICTED
    L2 prefetcher state, ACTIVE, PENDING, BLOCKED, SCATTER/GATHER,
PREDICTED
    I-side prefetcher state cycles remaining to phase completion
    D-side prefetcher state cycles remaining to phase completion
    L2 prefetcher state cycles remaining to phase completion
LSU (Load/Store Unit)
    LSU num LD transactions available
    LSU num ST transactions available
    LSU num atomic transactions inflight
    LSU num atomic transactions active
    LSU semaphore/fence active
    LD buffer number of entries remaining
    ST buffer number of entries remaining
PER CACHE LEVEL + MSS, 3 (I1$,D1$,L2$) + Mem sub-system
    Predicted $ hit/miss
    Predicted TLB hit/miss
    Victim buffer entries available
    Predicted victim buffer hit/miss
    Predicted store buffer hit/miss
PER SLICE (4x slices, 2 issue each)
    Replay active
    SLICE A side stall, B side stall
    SLICE computation site available
    SLICE computation site predict busy
    SLICE computation site remaining latency
```

-continued

```
BPU:
    (Here, I will assume that the BPU develops 4 predictions per cycle)
    IsBranch/Taken/NotTaken
    Forward branch predicted taken/not taken
    Backward branch predicted taken/not taken
    Branch predicted speculative
QUEUE status (full, empty, # free slots)
    BPQ, ITQ, ICQ, XIQ, D0Q, D1Q, XEQ, MRQ, DMQ, DEQ, DBQ, STB LDR
```

Method of Transform Control

In FIG. 8, I have illustrated, in flow diagram form, one embodiment of a method for controlling execution of developed transforms. In accordance with one embodiment of my invention in an electronic, digital data processor comprising a pipelined execution unit, a stream of instructions are fetched and decoded; and, for at least some selected instructions or instruction sequences, a predetermined transform is developed. Then, depending on predetermined static or dynamic conditions that may exist in the pipelined execution unit, execution of the transform may be allowed or suppressed. As I have noted above, the transform may be a fusion, a fracture or a binary transformation.

Embodiments

The integrated circuitry employed to implement the units shown herein may be expressed in various forms including as a netlist which takes the form of a listing of the electronic components in a circuit and the list of nodes to which each component is connected. Such a netlist may be provided via an article of manufacture as described below.

In other embodiments, the units shown in the block diagrams of the various figures can be implemented as software representations, for example in a hardware description language (such as for example Verilog) that describes the functions performed by the units described herein at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and includes instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above-described embodiment, method, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

APPENDIX 1

PRI DETAILS

Following is one possible embodiment of a PRI Select facility:

```
1.    // A common interface for all decoded instructions
2.    typedef struct {
3.         bit [15:0] hash; //16-bit comparison hash
4.         bit [4:0] rd;   //usual RISC-V fields
5.         bit [4:0] rs2;
6.         bit [4:0] rs1;
7.         bit [4:0] f3;
8.         bit [7:0] uid;   //unique ID field
9.         bit [19:0] imm;
10.        } decoded_inst_t;
11.
12.   //-------------------------------------------------------------------
13.   // A common interface for all transform groups no matter the length.
14.   //
15.   // The width and number of fields in this structure can change with
16.   // any design. These are examples are one implementation
17.   //-------------------------------------------------------------------
18.   typedef struct {
19.        //This is a common structure, the mask indicates which of the
20.        //fields below are used, tg_hash_0,1,etc; match_i0,1,2,etc;
21.        bit [3:0] mask;
22.
23.        //Each transform group has a length field, this is the pre-encoded
24.        //version of count_ones of mask
25.        bit [1:0] length;
26.
27.        //Each transform group is assigned a page and a bit in the TER
28.        bit [4:0] ter_bit;
29.        bit [4:0] ter_page;
30.
31.        //Each transform group is assigned a event group select value
32.        //Transform groups can share event_select values.
33.        //This is driven to the event select mux
34.        bit [7:0] event_select;
35.
36.        //Each transform group is assigned a transform select value
37.        //Transform groups can share transform_select values.
38.        //This is driven to the transform select mux
39.        bit [7:0] transform_select;
40.
41.        //Each transform group is assigned an instruction select value
42.        //Transform groups can share instruction_select values. They
43.        //can also include the pre-transformed instruction as transform_out
44.        bit [7:0] instruction_select;
45.
46.        // A transform group can encompass any number of comparisons.
47.        // This example has max 4, but the max can be anything.
48.        bit [15:0] tg_hash_0;
49.        bit [15:0] tg_hash_1;
50.        bit [15:0] tg_hash_2;
51.        bit [15:0] tg_hash_3;
52.        // match_i{0,3} contain the fields which are compared to the incoming
53.        // instructions for operand constrained transforms. The match_ix versions
54.        // contain the don't care or explicit values used in the comparison
55.        decoded_inst_t match_i0; //for input comparison
56.        decoded_inst_t match_i1;
57.        decoded_inst_t match_i2;
58.        decoded_inst_t match_i3;
59.
60.        decoded_inst_t transform_out; //for output
61.   } transform_group_t;
62.   // -------------------------------------------------------------------
63.   // -------------------------------------------------------------------
64.   // Master transform module
65.   module transform
66.   (
```

APPENDIX 1-continued

PRI DETAILS

```
67.        //The number of decoded_inst_t ports is the width of the instruction
68.        //decoder.
69.        //at a time.
70.        input decoded_inst_t i0,
71.        input decoded_inst_t i1,
72.        input decoded_inst_t i2,
73.
74.        //The number of transform_group_t ports is equal to the number
75.        //of transform groups implemented in hardware. This shows a simple
76.        //case of 4 transform groups.
77.        input transform_group_t t0,
78.        input transform_group_t t1,
79.        input transform_group_t t2,
80.        input transform_group_t t3,
81.
82.        input [31:0] ter,
83.
84.        //Output of the UID/hit/miss/translation blocks
85.        output reg [7:0] event_selector,
86.        output reg [7:0] instruction_selector,
87.        output reg [7:0] transform_selector,
88.        output reg   transform_valid,
89.
90.        //This is also output in this block in this example
91.        //but could be down stream given instruction_selector is
92.        //also output.
93.        output reg decoded_inst_t ins_out,
94.    );
95.
96.    // This select sets the output regs
97.    wire [2:0] group_select;
98.
99.    // Create the transform enable register wires
100.         wire [3:0] ter_page = ter[31:28];
101.         wire ter_sel_all   = ter_page == 4'hF;
102.         wire ter_sel none   = ter_page == 4'h0;
103.         // Create the transform group enables for each group
104.         // Both page and bit select must be enabled.
105.         wire tg_sel_page_0 = (t0.ter_page == ter_page) | ter_sel_all;
106.         wire tg_sel_0   = tg_sel_page_0 & ter[t0.ter_bit];
107.
108.         wire tg_sel_page_1 = (t1.ter_page == ter_page) | ter_sel_all;
109.         wire tg_sel_1   = tg_sel_page_1 & ter[t1.ter_bit];
110.
111.         wire tg_sel_page_2 = (t0.ter_page == ter_page) | ter_sel_all;
112.         wire tg_sel_2   = tg_sel_page_2 & ter[t2.ter_bit];
113.
114.         wire tg_sel_page_3 = (t0.ter_page == ter_page) | ter_sel_all;
115.         wire tg_sel_3   = tg_sel_page_3 & ter[t3.ter_bit];
116.
117.         // Create the transform group enables
118.         wire hash_hit_t0 = (t0.hash == i0.hash | !t0.mask[0])
119.                 && (t0.hash == i1.hash | !t0.mask[1])
120.                 && (t0.hash == i2.hash | !t0.mask[2]);
121.
122.         wire hash_hit_t1 = (t1.hash == i0.hash | !t1.mask[0])
123.                 && (t1.hash == i1.hash | !t1.mask[1])
124.                 && (t1.hash == i2.hash | !t1.mask[2]);
125.
126.         wire hash_hit_t2 = (t2.hash == i0.hash | !t2.mask[0])
127.                 && (t2.hash == i1.hash | !t2.mask[1])
128.                 && (t2.hash == i2.hash | !t2.mask[2]);
129.         wire multiple_hit = hash_hit_t0 | hash_hit_t1 | hash_hit_t2;
130.
131.         // Final mux
132.         always @* begin
133.           transform_valid = 1'b1;
134.           case(group_select)
135.             2'b00: begin
136.                 event_selector   = t0.event_selector;
137.                 instruction_selector = t0.instruction_selector;
138.                 transform_selector   = t0.transform_selector;
139.                 end
140.             2'b01: begin
141.                 event_selector   = t1.event_selector;
142.                 instruction_selector = t1.instruction_selector;
143.                 transform_selector =  t1.transform_selector;
144.                 end
```

APPENDIX 1-continued

PRI DETAILS

```
145.              2'b10: begin
146.                  event_selector    = t2.event_selector;
147.                  instruction_selector = t2.instruction_selector;
148.                  transform_selector  = t2.transform_selector;
149.                  end
150.              2'b11: transform_valid = 1'b0;
151.          endcase
152.      End
153.      group_selector u0(
154.          .length0(t0.length),
155.          .hit0   (hash_hit_t0),
156.          .length1(t1.length),
157.          .hit1   (hash_hit_t1),
158.          .length2(t2.length),
159.          .hit2   (hash_hit_t2),
160.          .selector(group_select)
161.      );
162.      endmodule
163.
164.      // -----------------------------------------------------------------
165.      // Module that performs hash compares and PRI select of figure 4
166.      // in the disclosure
167.      // -----------------------------------------------------------------
168.      module group_selector
169.      {
170.          input [1:0] length0,
171.          input   hit0,
172.          input [1:0] length1,
173.          input   hit1,
174.          input [1:0] length2,
175.          input   hit2,
176.          output [2:0] selector //1-hot
177.      );
178.
179.      // Intermediate variables to hold the max length and corresponding
180.      reg [1:0] max_length;
181.      reg [1:0] max_group;
182.
183.      always @(*) begin
184.          // Initialize with a minimum value and no group selected
185.          max_length = 0;
186.          max_group = 3'b000;
187.
188.          if (hit3 && length3 >= max_length) begin
189.              max_length = length3;
190.              max_group = 3'b100; // group 2
191.          end
192.
193.          if (hit2 && length2 >= max_length) begin
194.              max_length = length2;
195.              max_group = 3'b010; // group 1
196.          end
197.
198.          if (hit1 && length1 >= max_length) begin
199.              //max_length = length1;
200.              max_group = 3'b001; // group 0
201.          end
202.
203.          selector = max_group;
204.      end
205.      endmodule
```

What I claim is:

1. An electronic, digital data processor comprising:

a pipelined central processing unit comprising:

an instruction fetch facility adapted to:

fetch a stream of instructions; and output said fetched instructions in a predetermined order;

an instruction decode facility, coupled to the instruction fetch facility, and adapted to:

receive the fetched instructions output from the instruction fetch facility;

decode simultaneously M of said received fetched instructions;

receive dynamically an instruction transform comprising at least one decoded transform instruction;

receive dynamically an instruction transform select signal having a selected one of first and second states; and either:

output said decoded instructions in response to receiving said instruction transform select signal in said first state;

or:

output said instruction transform in response to receiving said instruction transform select signal in said second state; and an instruction execution facility comprising an instruction execution pipeline, coupled to the instruction decode facility, and adapted to:

receive the decoded instructions output from the instruction decode facility;

execute said decoded instructions in the instruction execution pipeline;

detect a predetermined pipeline event in the instruction execution pipeline; and either:

output a pipeline event signal in a third state if said predetermined dynamic condition in the instruction execution pipeline is not detected;

or:

output the pipeline event signal in a fourth state if said predetermined dynamic condition in the instruction execution pipeline is detected; and an instruction transform facility, coupled to the instruction decode facility and to the instruction execution facility, and adapted to:

receive the decoded instructions output from the instruction decode facility;

detect in the received decoded instructions a first predetermined sequence of N of said received decoded instructions, where N is greater than 1 and no greater than M;

develop said instruction transform of said first predetermined sequence of N of said received decoded instructions;

receive the pipeline event signal output from the instruction execution facility; and either:

output said instruction transform signal in said first state in response to receiving said pipeline event signal in said third state;

or:

output said instruction transform signal in said second state in response to receiving said pipeline event signal in said fourth state.

2. The data processor of claim 1 wherein the instruction transform comprises at least a selected one of:

a fusion;

a fracture; and a binary transformation.

3. The data processor of claim 1 wherein the pipeline event comprises a selected one of:

a static constraint; and a dynamic constraint.

4. A semiconductor device comprising an integrated circuit facility according to claim 1.

* * * * *